United States Patent
Lin

(10) Patent No.: US 7,624,751 B2
(45) Date of Patent: Dec. 1, 2009

(54) AIR NOZZLE FOR AUTOMATICALLY INFLATABLE AIR CUSHION

(75) Inventor: Ping-Ting Lin, Taichung Hsien (TW)

(73) Assignee: Feng Yi Outdoor Leisure Equipment Enterprise Co., Ltd., Taichung Hsien (TW)

( * ) Notice: Subject to any disclaimer, the term of this patent is extended or adjusted under 35 U.S.C. 154(b) by 239 days.

(21) Appl. No.: 11/648,988

(22) Filed: Jan. 3, 2007

(65) Prior Publication Data

US 2008/0156376 A1 Jul. 3, 2008

(51) Int. Cl.
*F16K 15/20* (2006.01)

(52) U.S. Cl. .......................................... 137/223; 251/83

(58) Field of Classification Search ......... 137/223–233; 251/82, 100, 149.4, 149.8, 149.9, 264, 273, 251/276, 349, 351, 354, 83; 5/706
See application file for complete search history.

(56) References Cited

U.S. PATENT DOCUMENTS

| 5,405,120 | A  | * | 4/1995  | Kerpan et al. ............ 251/149.9 |
| 5,819,779 | A  | * | 10/1998 | Takemura et al. ............ 137/228 |
| 5,960,840 | A  | * | 10/1999 | Simmel et al. ............ 251/149.8 |
| 6,622,749 | B2 | * | 9/2003  | Li ............................... 137/223 |
| 7,063,102 | B2 | * | 6/2006  | Lin .............................. 137/223 |
| 7,066,442 | B2 | * | 6/2006  | Rose ....................... 251/149.8 |
| 7,434,594 | B1 | * | 10/2008 | Robbins et al. ............. 137/223 |
| 2005/0056314 | A1 | * | 3/2005 | Lin .............................. 137/223 |

\* cited by examiner

*Primary Examiner*—Stephen Hepperle
*Assistant Examiner*—Craig Price
(74) *Attorney, Agent, or Firm*—Alan Kamrath; Kamrath & Associates PA

(57) ABSTRACT

An air nozzle for an automatically inflatable air cushion includes a mounting seat, a connecting pipe having a first end mounted on the mounting seat and a second end formed with a passage connected to the mounting seat, a control valve including a valve body movably mounted on the connecting pipe and a valve cap mounted on the valve body and provided with a protruding seal portion that is movable to seal the passage, and an elastic member to push the seal portion outwardly relative to the passage. Thus, the air nozzle can be locked quickly and exactly to interrupt the air flow to prevent the air flow from being returned into the automatically inflatable air cushion.

12 Claims, 5 Drawing Sheets ically inflatable air cushion in accordance with the prior art shown in FIG. 7 comprises a mounting seat 30 mounted on an automatically inflatable air cushion 31 containing a packing 311, a connecting pipe 10 having a first end mounted on the mounting seat 30 by ratchet teeth 16 and limit bosses 15, a mediate portion formed with an outer thread 14 and a second end formed with a mounting portion 12 having an inside formed with an annular passage 13 connected to the mounting seat 30, a control cap 20 rotatably mounted on the connecting pipe 10 and having an inside formed with an inner thread 24 screwed onto the outer thread 14 of the connecting pipe 10 and an end face 21 provided with a protruding seal portion 23 that is movable to seal the passage 13 of the connecting pipe 10, and a gasket 11 mounted in the passage 13 of the connecting pipe 10 to press the seal portion 23 of the control cap 20 when the seal portion 23 of the control cap 20 is inserted into the passage 13 of the connecting pipe 10. The connecting pipe 10 has an inside formed with an air chamber 101 connected between the mounting seat 30 and the passage 13. The control cap 20 has an inside formed with an air channel 25 connected to the passage 13 of the connecting pipe 10 when the seal portion 23 of the control cap 20 is detached from the passage 13 of the connecting pipe 10. The end face 21 of the control cap 20 has a peripheral wall formed with a plurality of air vents 22 connected to the air channel 25.

AIR NOZZLE FOR AUTOMATICALLY INFLATABLE AIR CUSHION

BACKGROUND OF THE INVENTION

1. Field of the Invention

The present invention relates to an air nozzle and, more particularly, to an air nozzle for an automatically inflatable air cushion.

2. Description of the Related Art

A conventional air nozzle for an automatically inflatable air cushion in accordance with the prior art shown in FIG. 7 comprises a mounting seat 30 mounted on an automatically inflatable air cushion 31 containing a packing 311, a connecting pipe 10 having a first end mounted on the mounting seat 30 by ratchet teeth 16 and limit bosses 15, a mediate portion formed with an outer thread 14 and a second end formed with a mounting portion 12 having an inside formed with an annular passage 13 connected to the mounting seat 30, a control cap 20 rotatably mounted on the connecting pipe 10 and having an inside formed with an inner thread 24 screwed onto the outer thread 14 of the connecting pipe 10 and an end face 21 provided with a protruding seal portion 23 that is movable to seal the passage 13 of the connecting pipe 10, and a gasket 11 mounted in the passage 13 of the connecting pipe 10 to press the seal portion 23 of the control cap 20 when the seal portion 23 of the control cap 20 is inserted into the passage 13 of the connecting pipe 10. The connecting pipe 10 has an inside formed with an air chamber 101 connected between the mounting seat 30 and the passage 13. The control cap 20 has an inside formed with an air channel 25 connected to the passage 13 of the connecting pipe 10 when the seal portion 23 of the control cap 20 is detached from the passage 13 of the connecting pipe 10. The end face 21 of the control cap 20 has a peripheral wall formed with a plurality of air vents 22 connected to the air channel 25.

In practice, the inner thread 24 of the control cap 20 is screwed onto the outer thread 14 of the connecting pipe 10, so that when the control cap 20 is rotated relative to the connecting pipe 10, the seal portion 23 of the control cap 20 is movable relative to the passage 13 of the connecting pipe 10. Thus, the seal portion 23 of the control cap 20 is movable to detach from the passage 13 of the connecting pipe 10 to open a connection between the air channel 25 of the control cap 20 and the passage 13 of the connecting pipe 10, so that an air from the ambient environment is in turn introduced through the air vents 22 of the control cap 20, the air channel 25 of the control cap 20, the passage 13 of the connecting pipe 10, the air chamber 101 of the connecting pipe 10 and the mounting seat 30 into the automatically inflatable air cushion 31 so as to inflate the automatically inflatable air cushion 31 automatically. On the contrary, the seal portion 23 of the control cap 20 is movable to seal the passage 13 of the connecting pipe 10 to interrupt the connection between the air channel 25 of the control cap 20 and the passage 13 of the connecting pipe 10, so as to stop the air flow into the automatically inflatable air cushion 31.

However, the user needs to rotate the control cap 20 successively to move the seal portion 23 of the control cap 20 to detach from the passage 13 of the connecting pipe 10 so as to open the air flow or to move the seal portion 23 of the control cap 20 to seal the passage 13 of the connecting pipe 10 so as to close the air flow, thereby causing inconvenience to the user when operating the air nozzle. In addition, after inflation of the automatically inflatable air cushion 31, the user needs to rotate the control cap 20 successively to move the seal portion 23 of the control cap 20 to seal the passage 13 of the connecting pipe 10 so as to close the air flow, so that the air easily leaks from the automatically inflatable air cushion 31 before the seal portion 23 of the control cap 20 seals the passage 13 of the connecting pipe 10, thereby decreasing the inflating effect.

BRIEF SUMMARY OF THE INVENTION

In accordance with the present invention, there is provided an air nozzle, comprising a mounting seat, a connecting pipe having a first end mounted on the mounting seat and a second end formed with a passage connected to the mounting seat, a control valve mounted on the connecting pipe and including a valve body movably mounted on the connecting pipe, and a valve cap mounted on the valve body and provided with a protruding seal portion that is movable to seal the passage of the connecting pipe, and an elastic member biased between the connecting pipe and the valve cap of the control valve to push the seal portion of the valve cap outwardly relative to the passage of the connecting pipe.

The primary objective of the present invention is to provide an air nozzle that can be locked quickly and exactly to interrupt the air flow to prevent the air flow from being returned into the automatically inflatable air cushion.

Another objective of the present invention is to provide an air nozzle, wherein the user only needs to press the control valve toward the connecting pipe and to rotate the control valve relative to the connecting pipe to lock the control valve onto the connecting pipe so as to lock the air nozzle, thereby facilitating the user locking the air nozzle.

A further objective of the present invention is to provide an air nozzle, wherein the user only needs to rotate the control valve relative to the connecting pipe to unlock the control valve from the connecting pipe by the restoring force of the elastic member so as to unlock the air nozzle, thereby facilitating the user unlocking the air nozzle.

A further objective of the present invention is to provide an air nozzle, wherein the air nozzle is locked and unlocked easily and quickly, thereby facilitating the user locking and unlocking the air nozzle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
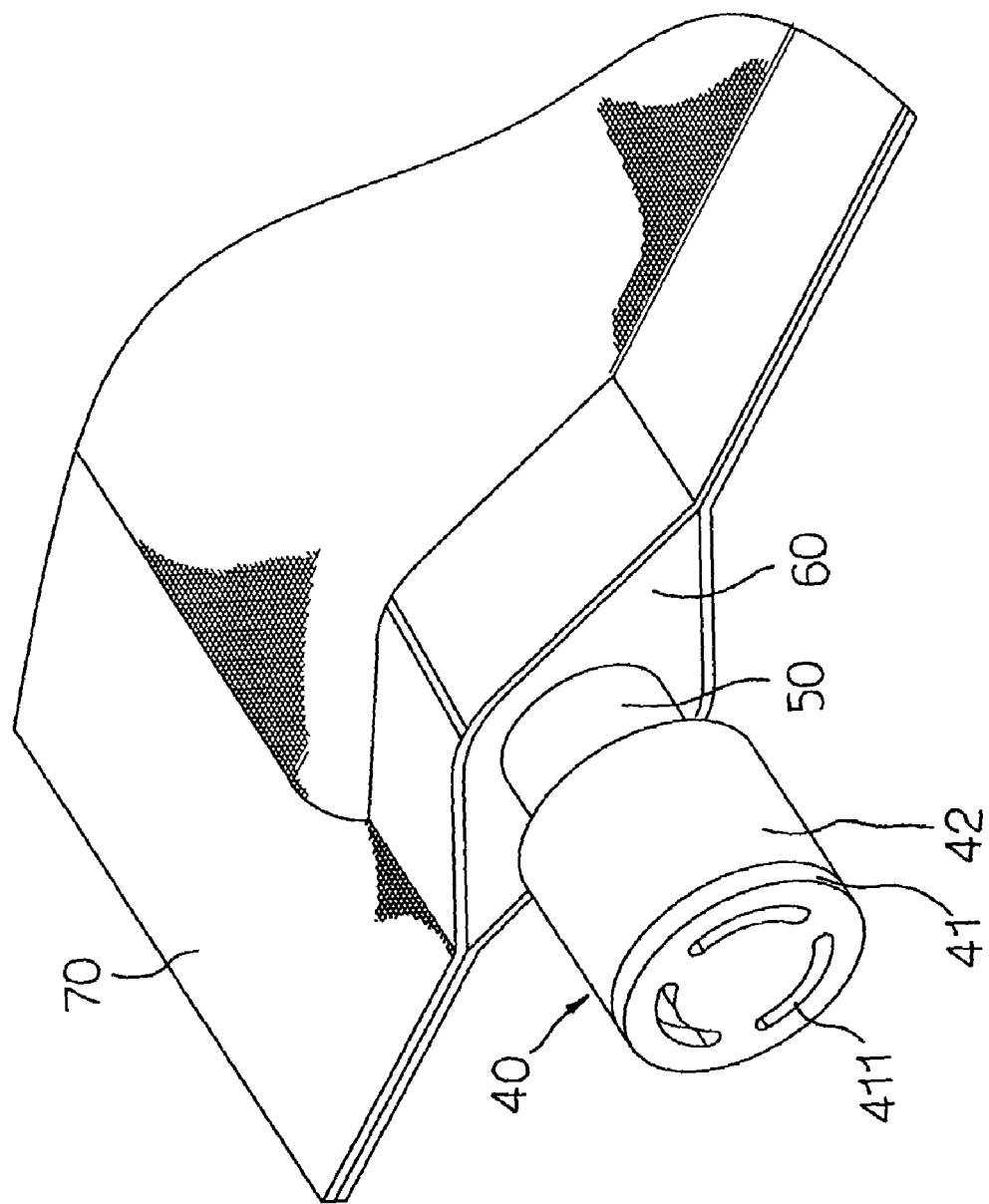
FIG. 1 is a partially cut-away perspective view of an air nozzle for an automatically inflatable air cushion in accordance with the preferred embodiment of the present invention.
Figure 2:
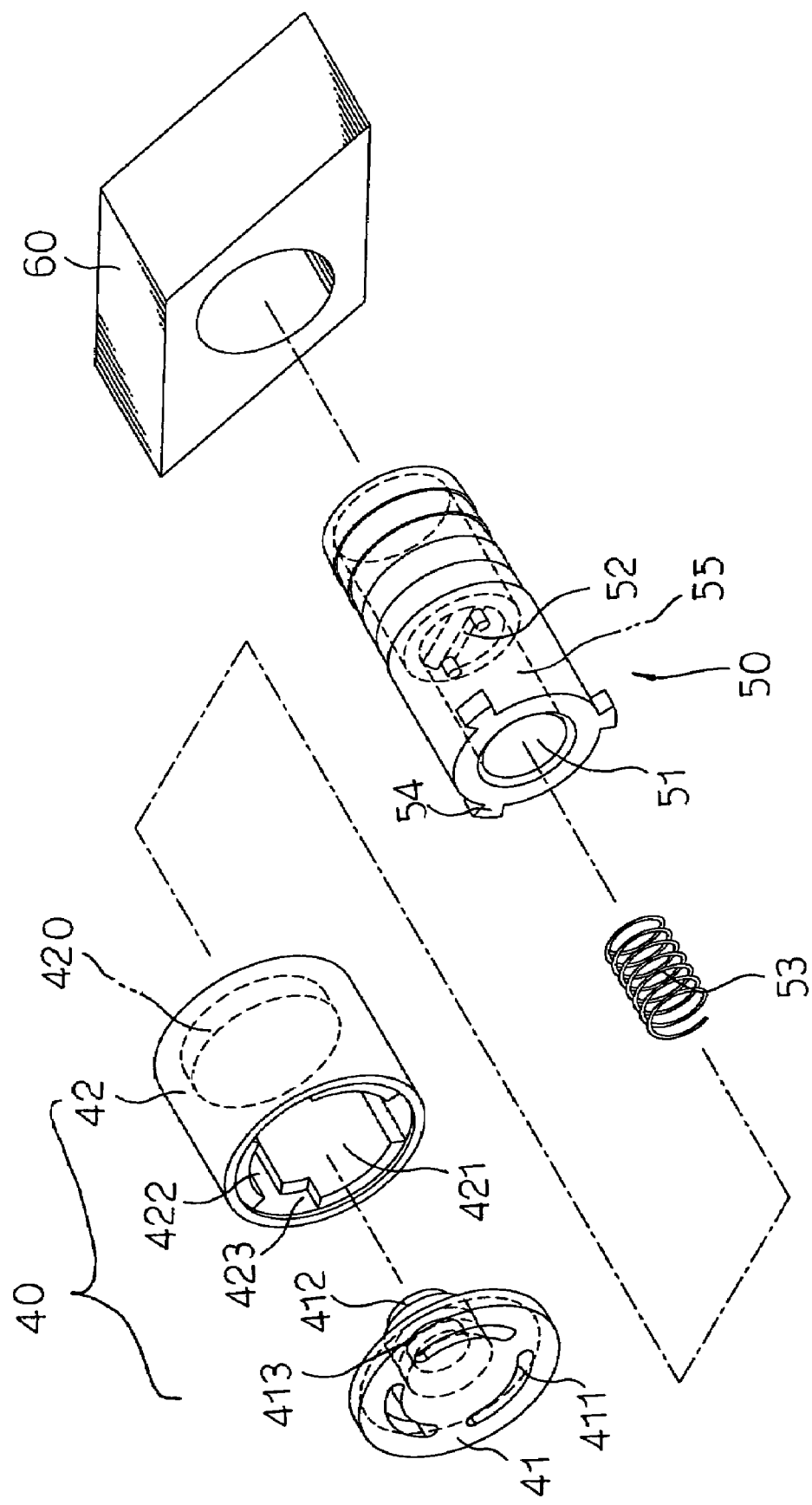
FIG. 2 is an exploded perspective view of the air nozzle as shown in FIG. 1.
Figure 3:
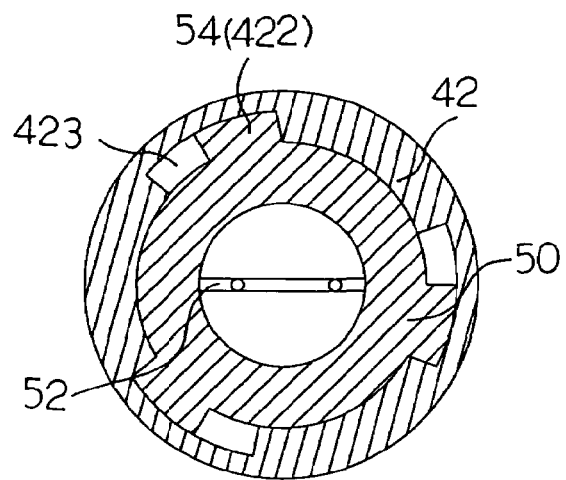
FIG. 3 is a front cross-sectional view of the air nozzle as shown in FIG. 1.

Referring to the drawings and initially to FIGS. 1-3, an air nozzle in accordance with the preferred embodiment of the present invention comprises a mounting seat 60 mounted on an automatically inflatable air cushion 70, a connecting pipe 50 having a first end mounted on the mounting seat 60 and a second end formed with a passage 51 connected to the mounting seat 60, a control valve 40 mounted on the connecting pipe 50 and including a valve body 42 movably mounted on the connecting pipe 50 and a valve cap 41 mounted on the valve body 42 and provided with a protruding seal portion 412 that is movable to seal the passage 51 of the connecting pipe 50, and an elastic member 53 biased between the connecting pipe 50 and the valve cap 41 of the control valve 40 to push the seal portion 412 of the valve cap 41 outwardly relative to the passage 51 of the connecting pipe 50.

The valve body 42 of the control valve 40 has an inner wall formed with at least one axially extending elongated guide slot 422 having a distal end formed with a locking groove 423. The guide slot 422 extends through a whole length of the valve body 42 of the control valve 40. The valve body 42 of the control valve 40 is movable axially on the connecting pipe 50. The valve body 42 of the control valve 40 has a substantially cylindrical shape and has an inside formed with an air channel 421 connected to the passage 51 of the connecting pipe 50 when the seal portion 412 of the valve cap 41 is detached from the passage 51 of the connecting pipe 50. The air channel 421 of the valve body 42 is connected to the guide slot 422 and the locking groove 423. The valve body 42 of the control valve 40 has a first end movably mounted on the connecting pipe 50 and a second end on which the valve cap 41 of the control valve 40 is mounted. The first end of the valve body 42 has a distal portion formed with a radially and inwardly extending limit flange 420. The locking groove 423 of the valve body 42 is located at the second end of the valve body 42 and located beside the valve cap 41.

The valve cap 41 of the control valve 40 has a peripheral wall formed with a plurality of air vents 411 connected to the air channel 421 of the valve body 42. The valve cap 41 of the control valve 40 has a side bonded on a side of the second end of the valve body 42 by a high frequency wave.

The control valve 40 further includes an annular gasket 413 mounted on the seal portion 412 of the valve cap 41 to press a wall of the passage 51 of the connecting pipe 50 when the seal portion 412 of the valve cap 41 is inserted into the passage 51 of the connecting pipe 50 to provide an air-tight effect between the seal portion 412 of the valve cap 41 and the passage 51 of the connecting pipe 50.

The connecting pipe 50 has an inside formed with an air chamber 55 connected between the mounting seat 60 and the passage 51. The air chamber 55 of the connecting pipe 50 has a stepped shape and has a mediate portion formed with a retaining shoulder 56. The connecting pipe 50 has an outer wall formed with at least one outwardly extending locking slide 54 slidable in the guide slot 422 of the valve body 42 when the valve body 42 is movable relative to the connecting pipe 50 and locked in the locking groove 423 of the valve body 42 when the valve body 42 is rotatable relative to the connecting pipe 50. The locking slide 54 of the connecting pipe 50 is flush with an edge of the second end of the connecting pipe 50 and located beside the passage 51. Thus, when the seal portion 412 of the valve cap 41 is inserted into the passage 51 of the connecting pipe 50, the locking slide 54 of the connecting pipe 50 is locked in the locking groove 423 of the valve body 42 by rotation of the valve body 42 relative to the connecting pipe 50.

A fixing seat 52 is mounted in the air chamber 55 of the connecting pipe 50 and rested on the retaining shoulder 56 of the connecting pipe 50. The elastic member 53 has a first end attached to the fixing seat 52 and a second end attached to the seal portion 412 of the valve cap 41. Thus, when the valve cap 41 of the control valve 40 is pushed outwardly relative to the connecting pipe 50 by the elastic member 53, the limit flange 420 of the valve body 42 is movable to rest on the locking slide 54 of the connecting pipe 50 to prevent the valve body 42 from being detached from the connecting pipe 50.

In the preferred embodiment of the present invention, the valve body 42 of the control valve 40 has three equally spaced guide slots 422 and three equally spaced locking grooves 423, and the connecting pipe 50 has three equally spaced locking slides 54 each slidable in the respective guide slot 422 of the valve body 42 when the valve body 42 is movable relative to the connecting pipe 50 and each locked in the respective locking groove 423 of the valve body 42 when the valve body 42 is rotatable relative to the connecting pipe 50.

Figure 4:
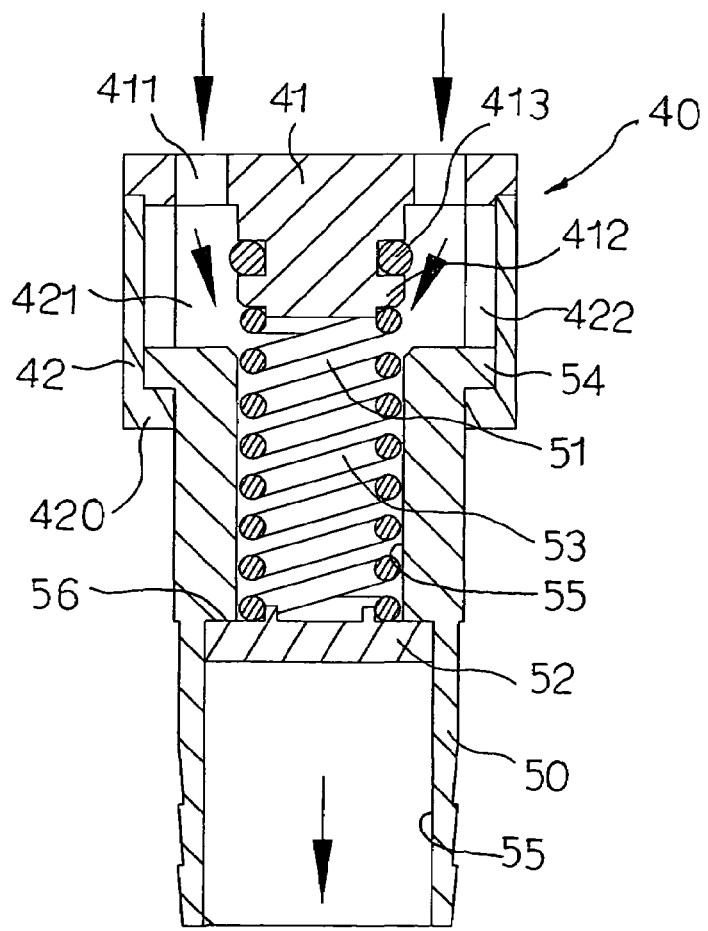
FIG. 4 is a top cross-sectional view of the air nozzle as shown in FIG. 1.

As shown in FIGS. 2, 3 and 4, when the valve cap 41 of the control valve 40 is pushed outwardly relative to the connecting pipe 50 by the elastic member 53, the seal portion 412 of the valve cap 41 is movable outwardly relative to the passage 51 of the connecting pipe 50 to detach from the passage 51 of the connecting pipe 50 to open a connection between the air channel 421 of the valve body 42 and the passage 51 of the connecting pipe 50, so that an air from the ambient environment is in turn introduced through the air vents 411 of the valve cap 41, the air channel 421 of the valve body 42, the passage 51 of the connecting pipe 50, the air chamber 55 of the connecting pipe 50 and the mounting seat 60 into the automatically inflatable air cushion 70 so as to inflate the automatically inflatable air cushion 70 automatically.

Figure 5:
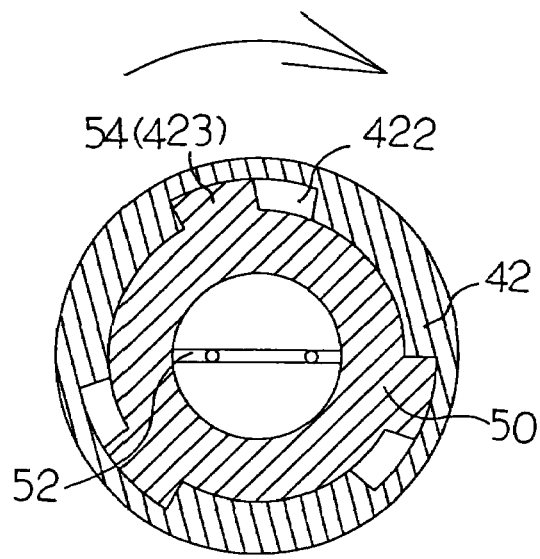
FIG. 5 is a schematic operational view of the air nozzle as shown in FIG. 3.
Figure 6:
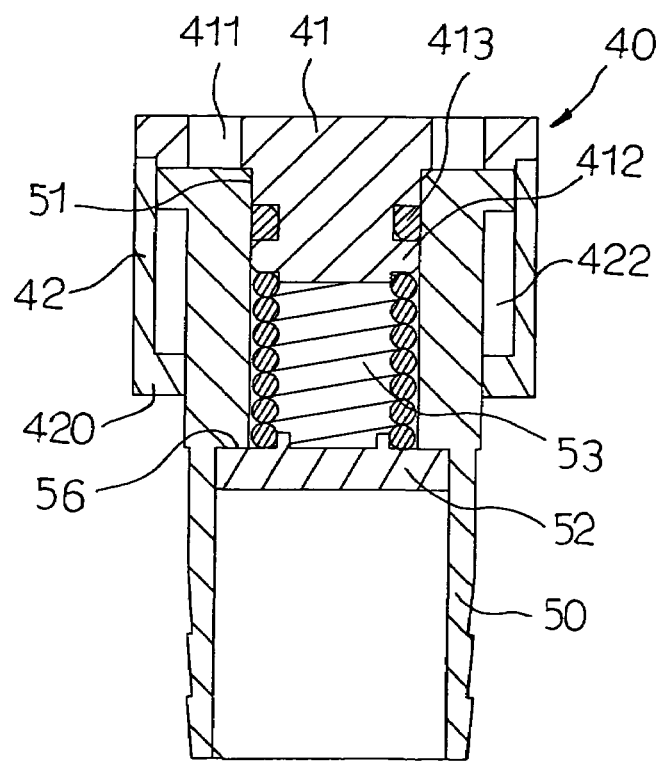
FIG. 6 is a schematic operational view of the air nozzle as shown in FIG. 4.
Figure 7:
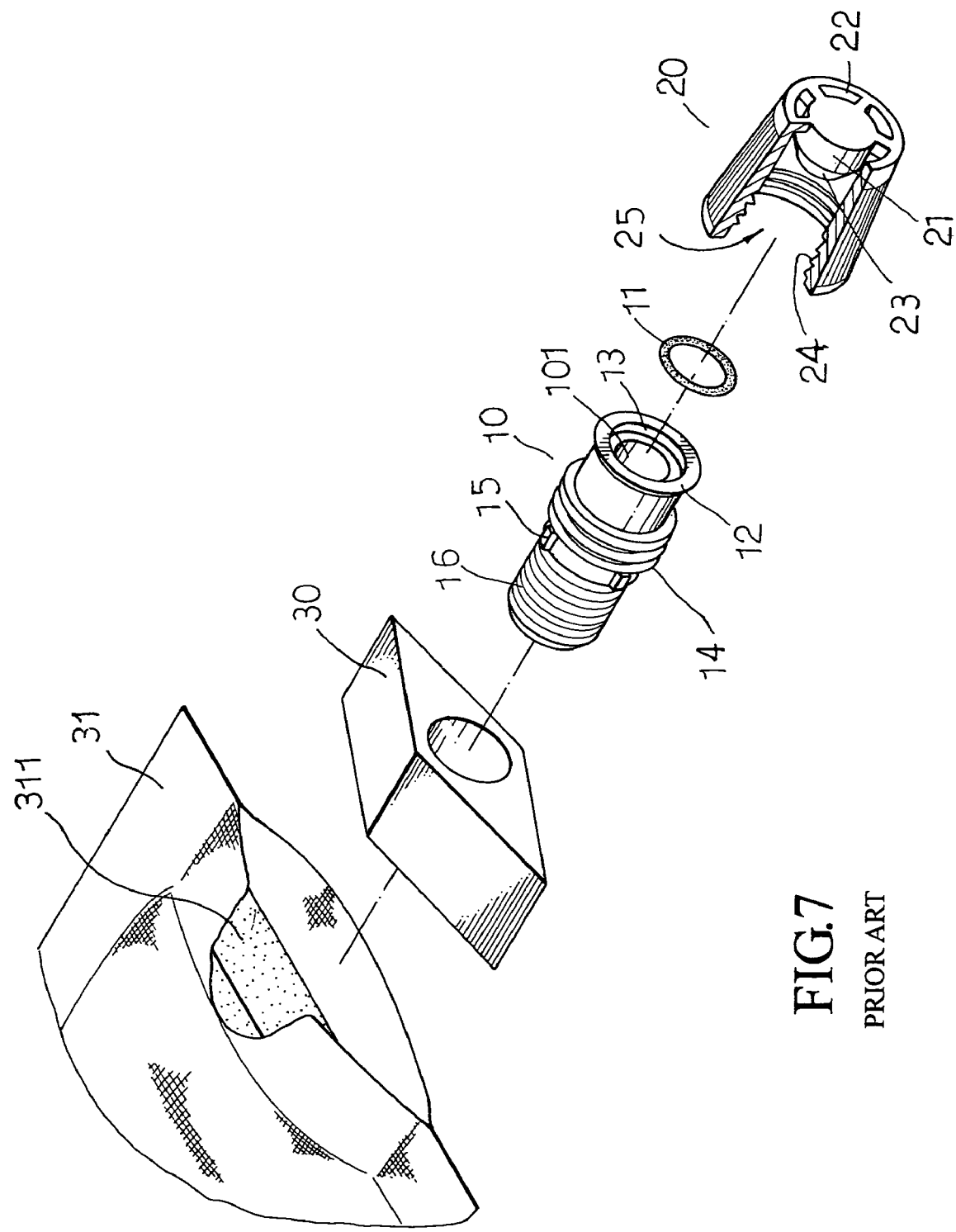
FIG. 7 is an exploded perspective view of a conventional air nozzle for an automatically inflatable air cushion in accordance with the prior art.

As shown in FIGS. 2, 5 and 6, when the valve cap 41 of the control valve 40 is pushed toward the connecting pipe 50 to compress the elastic member 53, the seal portion 412 of the valve cap 41 is moved toward and inserted into the passage 51 of the connecting pipe 50 to interrupt the connection between the air channel 421 of the valve body 42 and the passage 51 of the connecting pipe 50 so as to stop the air flow into the automatically inflatable air cushion 70.

At this time, the locking slide 54 of the connecting pipe 50 aligns with the locking groove 423 of the valve body 42 when the valve cap 41 is rested on the edge of the second end of the connecting pipe 50, so that the locking slide 54 of the connecting pipe 50 is locked in the locking groove 423 of the guide slot 422 by rotation of the valve body 42 relative to the connecting pipe 50 to lock the control valve 40 onto the connecting pipe 50 so as to achieve an air-tight effect.

Accordingly, the user only needs to press the control valve 40 toward the connecting pipe 50 and to rotate the control valve 40 relative to the connecting pipe 50 to lock the control valve 40 onto the connecting pipe 50 so as to lock the air nozzle, thereby facilitating the user locking the air nozzle. In addition, the user only needs to rotate the control valve 40 relative to the connecting pipe 50 to unlock the control valve 40 from the connecting pipe 50 by the restoring force of the elastic member 53 so as to unlock the air nozzle, thereby facilitating the user unlocking the air nozzle. Further, the air nozzle is locked and unlocked easily and quickly, thereby facilitating the user locking and unlocking the air nozzle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An air nozzle, comprising:
   a mounting seat;
   a connecting pipe having a first end mounted on the mounting seat and a second end formed with a passage connected to the mounting seat;
   a control valve mounted on the connecting pipe and including a valve body movably mounted on the connecting pipe, and a valve cap mounted on the valve body and provided with a protruding seal portion that is movable to seal the passage of the connecting pipe;
   an elastic member biased between the connecting pipe and the valve cap of the control valve to push the seal portion of the valve cap outwardly relative to the passage of the connecting pipe; wherein:
   the valve body of the control valve has an inner wall formed with at least one axially extending elongated guide slot having a distal end formed with a locking groove;
   the connecting pipe has an outer wall formed with at least one outwardly extending locking slide;
   the locking slide of the connecting pipe is slidable axially in the guide slot of the valve body when the valve body is movable axially relative to the connecting pipe;
   the locking slide of the connecting pipe is introduced from the guide slot into the locking groove of the valve body and locked in the locking groove of the valve body when the valve body is rotatable relative to the connecting pipe;
   the connecting pipe has an inside formed with an air chamber connected between the mounting seat and the passage;
   the air chamber of the connecting pipe has a stepped shape and has a mediate portion formed with a stepped retaining shoulder, and the air nozzle further comprises a fixing seat mounted in the air chamber of the connecting pipe and rested on the retaining shoulder of the connecting pipe.

2. The air nozzle in accordance with claim 1, wherein the valve body of the control valve has an inside formed with an air channel connected to the passage of the connecting pipe when the seal portion of the valve cap is detached from the passage of the connecting pipe.

3. The air nozzle in accordance with claim 2, wherein the air channel of the valve body is connected to the guide slot and the locking groove.

4. An air nozzle, comprising:
   a mounting seat;
   a connecting pipe having a first end mounted on the mounting seat and a second end formed with a passage connected to the mounting seat;
   a control valve mounted on the connecting pipe and including a valve body movably mounted on the connecting pipe, and a valve cap mounted on the valve body and provided with a protruding seal portion that is movable to seal the passage of the connecting pipe;
   an elastic member biased between the connecting pipe and the valve cap of the control valve to push the seal portion of the valve cap outwardly relative to the passage of the connecting pipe; wherein:
   the valve body of the control valve has an inner wall formed with at least one axially extending elongated guide slot having a distal end formed with a locking groove;
   the connecting pipe has an outer wall formed with at least one outwardly extending locking slide;
   the locking slide of the connecting pipe is slidable axially in the guide slot of the valve body when the valve body is movable axially relative to the connecting pipe;
   the locking slide of the connecting pipe is introduced from the guide slot into the locking groove of the valve body and locked in the locking groove of the valve body when the valve body is rotatable relative to the connecting pipe;
   the valve body of the control valve has a first end movably mounted on the connecting pipe and a second end on which the valve cap of the control valve is mounted;
   the second end of the valve body is pushed by the elastic member to protrude outwardly from the connecting pipe;
   the first end of the valve body has a distal portion formed with a radially and inwardly extending limit flange, and when the valve cap of the control valve is pushed outwardly relative to the connecting pipe by the elastic member, the limit flange of the valve body is movable to rest on the locking slide of the connecting pipe to prevent the valve body from being detached from the connecting pipe;
   the guide slot of the valve body extends successively from the limit flange of the valve body to the locking groove of the valve body to guide a movement of the locking slide of the connecting pipe successively during an axial movement of the valve body relative to the connecting pipe.

5. The air nozzle in accordance with claim 1, wherein the valve cap of the control valve has a side bonded on a side of the second end of the valve body by a high frequency wave.

6. The air nozzle in accordance with claim 1, wherein the control valve further includes an annular gasket mounted on the seal portion of the valve cap wherein the annular gasket is movable in concert with the seal portion of the valve cap to press a wall of the passage of the connecting pipe when the seal portion of the valve cap is inserted into the passage of the connecting pipe to provide an air-tight effect between the seal portion of the valve cap and the passage of the connecting pipe.

7. The air nozzle in accordance with claim 1, wherein the elastic member has a first end attached to the fixing seat and a second end attached to the seal portion of the valve cap.

8. The air nozzle in accordance with claim 1, wherein the valve body of the control valve has three equally spaced guide slots and three equally spaced locking grooves, and the connecting pipe has three equally spaced locking slides each slidable axially in the respective guide slot of the valve body when the valve body is movable axially relative to the connecting pipe and each locked in the respective locking groove of the valve body when the valve body is rotatable relative to the connecting pipe.

9. The air nozzle in accordance with claim 2, wherein:
   when the valve cap of the control valve is pushed outwardly relative to the connecting pipe by the elastic member, the seal portion of the valve cap is movable outwardly relative to the passage of the connecting pipe to detach from the passage of the connecting pipe to open a connection between the air channel of the valve body and the passage of the connecting pipe;
   when the valve cap of the control valve is pushed toward the connecting pipe to compress the elastic member, the seal portion of the valve cap is moved toward and inserted into the passage of the connecting pipe to interrupt the connection between the air channel of the valve body and the passage of the connecting pipe.

10. The air nozzle in accordance with claim 4, wherein the locking groove of the valve body is located at the second end of the valve body and located beside the valve cap.

11. The air nozzle in accordance with claim 1, wherein when the seal portion of the valve cap is inserted into the passage of the connecting pipe, the locking slide of the connecting pipe is aligned with and locked in the locking groove of the valve body by rotation of the valve body relative to the connecting pipe.

12. An air nozzle, comprising:
a mounting seat;
a connecting pipe having a first end mounted on the mounting seat and a second end formed with a passage connected to the mounting seat;
a control valve mounted on the connecting pipe and including a valve body movably mounted on the connecting pipe, and a valve cap mounted on the valve body and provided with a protruding seal portion that is movable to seal the passage of the connecting pipe;
an elastic member biased between the connecting pipe and the valve cap of the control valve to push the seal portion of the valve cap outwardly relative to the passage of the connecting pipe; wherein:

the valve body of the control valve has an inner wall formed with at least one axially extending elongated guide slot having a distal end formed with a locking groove;
the connecting pipe has an outer wall formed with at least one outwardly extending locking slide;
the locking slide of the connecting pipe is slidable axially in the guide slot of the valve body when the valve body is movable axially relative to the connecting pipe;
the locking slide of the connecting pipe is introduced from the guide slot into the locking groove of the valve body and locked in the locking groove of the valve body when the valve body is rotatable relative to the connecting pipe;
the guide slot extends axially through a whole length of the valve body of the control valve;
the locking slide of the connecting pipe is in slidable contact with the guide slot of the valve body constantly through the whole length of the valve body of the control valve during an axial movement of the valve body relative to the connecting pipe.

* * * * *